United States Patent [19]

Moore

[11] 4,098,407
[45] Jul. 4, 1978

[54] LUMBER SORTING APPARATUS

[75] Inventor: Jack Moore, Portland, Oreg.

[73] Assignee: Lumber Systems, Inc., Portland, Oreg.

[21] Appl. No.: 722,638

[22] Filed: Sep. 13, 1976

[51] Int. Cl.² ........................................... B65G 47/34
[52] U.S. Cl. ................................................. 209/74 R
[58] Field of Search ............... 209/74; 214/6 H, 6 D, 214/6 DK; 294/74–76; 224/49

[56] References Cited

U.S. PATENT DOCUMENTS

| 664,057 | 12/1900 | Olson | 294/75 |
|---|---|---|---|
| 2,998,133 | 8/1961 | Rambo | 209/90 |
| 3,604,563 | 9/1971 | Ronan | 209/74 |
| 3,696,948 | 10/1972 | Murdoch | 214/6 H |
| 3,776,379 | 12/1973 | Harvey | 209/73 |

Primary Examiner—Allen N. Knowles
Attorney, Agent, or Firm—Kolisch, Hartwell, Dickinson & Stuart

[57] ABSTRACT

A lumber sorter in which flexible slings define the bins for receiving sorted lumber. One end of each sling is selectively releasable from attachment to the sorter frame so as to effect release of lumber onto underlying conveyor chains. Mechanism is included for taking up a released sling, and in the process, for causing recapture of the freed end of the sling so as to reform a bin for the later receipt of lumber.

13 Claims, 10 Drawing Figures

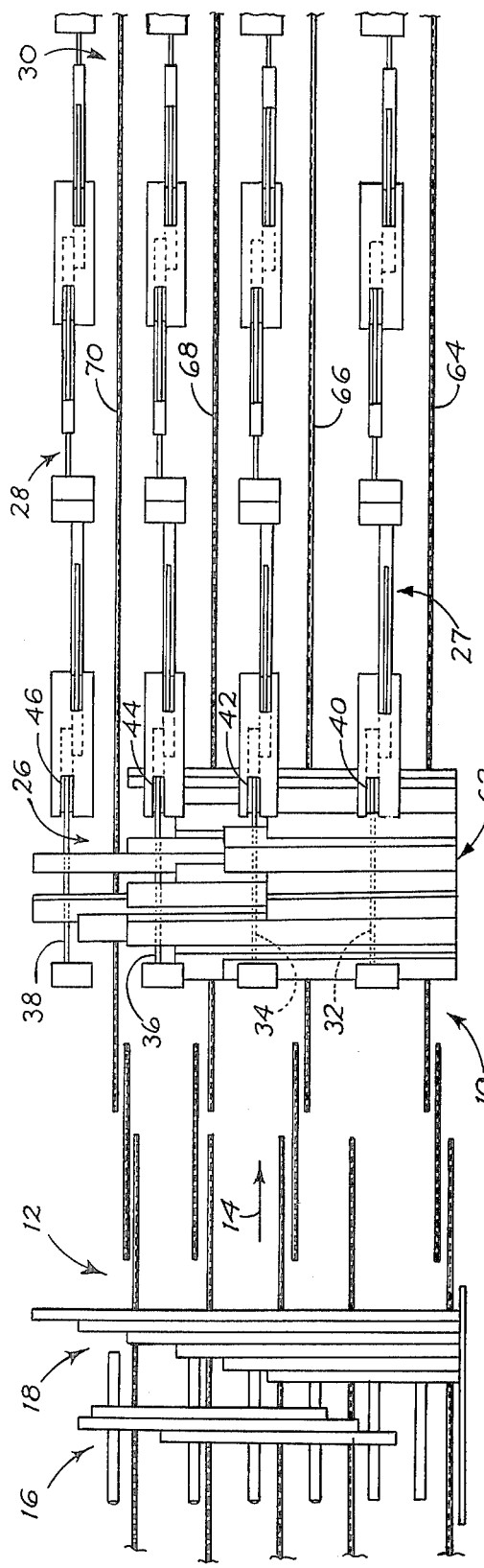
Fig. 1.
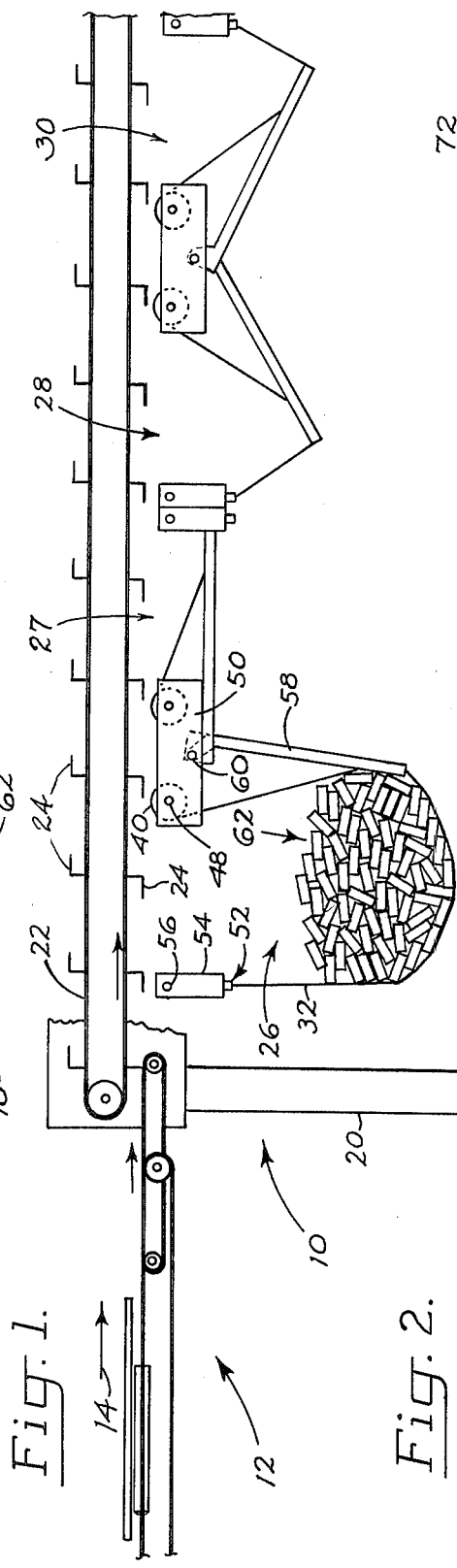
Fig. 2.
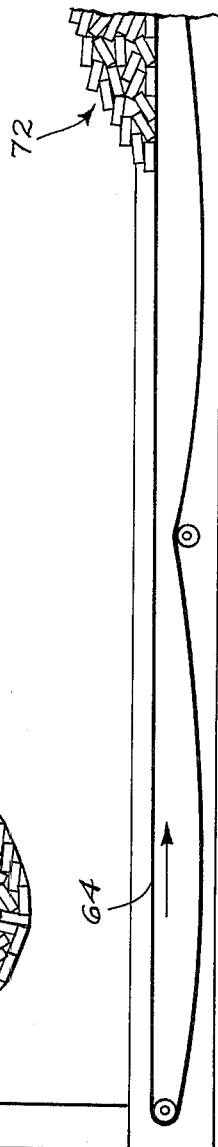

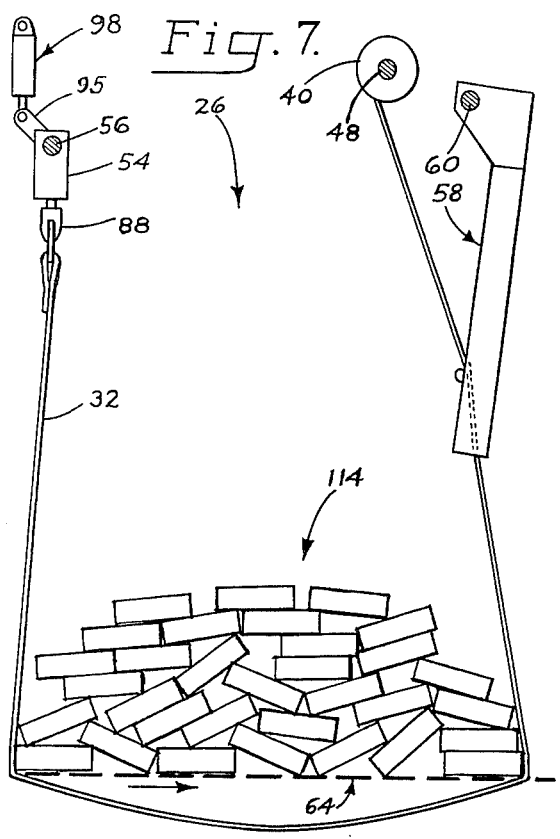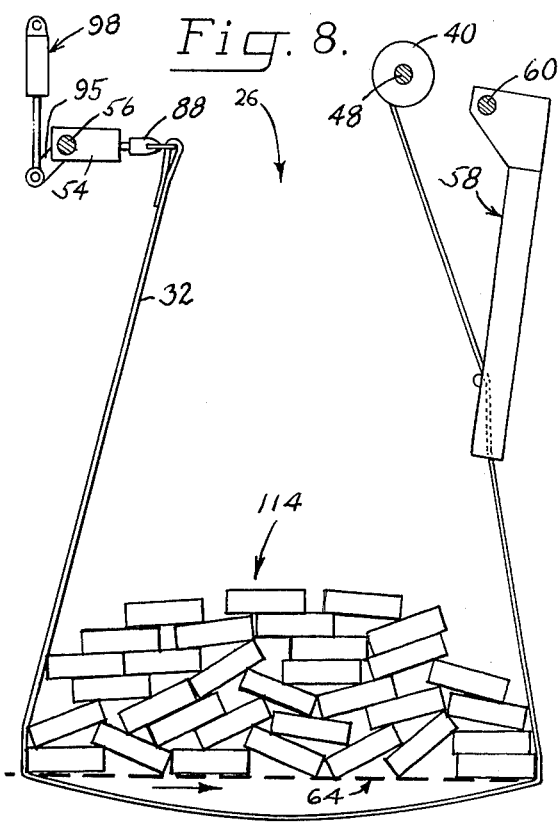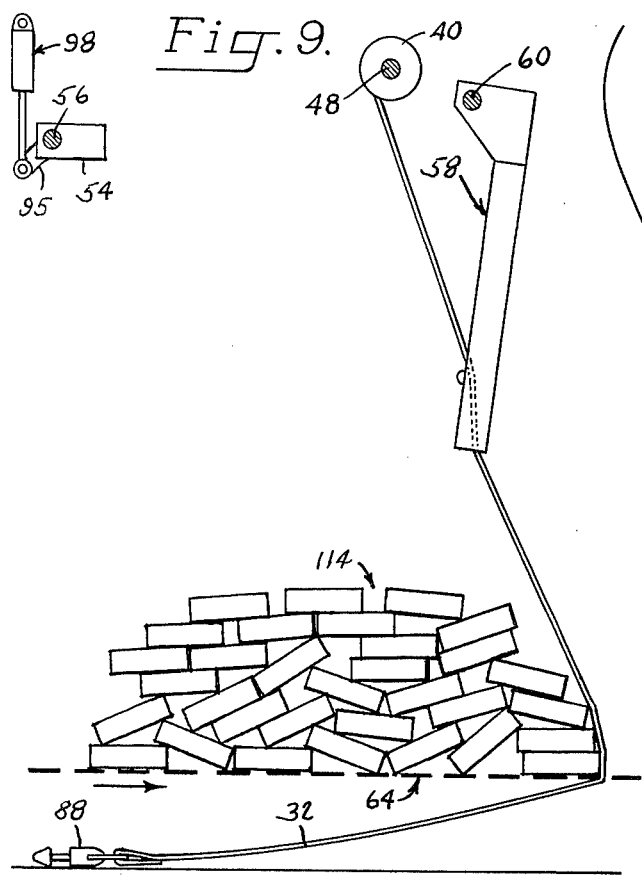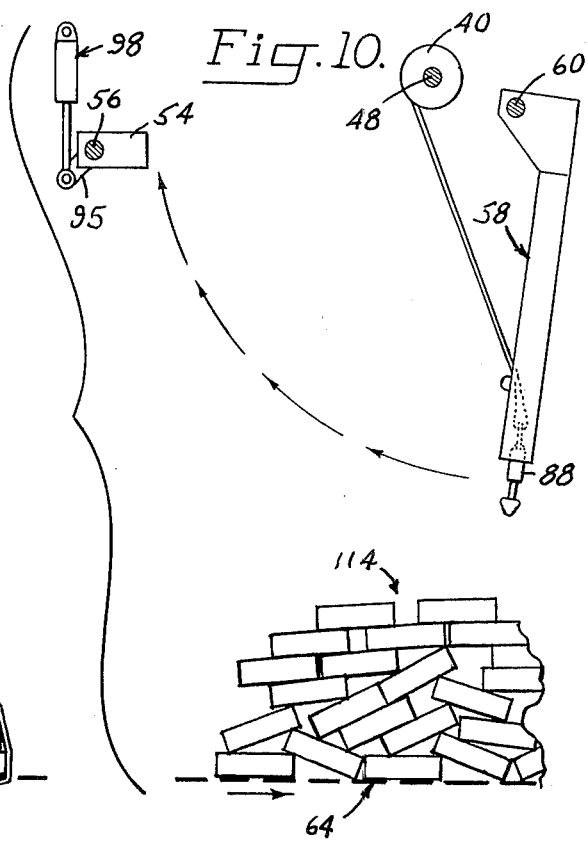

LUMBER SORTING APPARATUS

BACKGROUND AND SUMMARY OF THE INVENTION

This invention pertains to a lumber sorter, and more particularly to such a sorter wherein flexible slings having releasable ends are used to form the bins for receiving sorted lumber.

Sling-type lumber sorters have been proposed in the past, and are in use. In these machines, lumber-receiving bins are each defined by a pair of laterally spaced flexible slings. Such slings are anchored at one set of ends to the sorter frame, and are mounted at their other set of ends on the frame through power-operated reels and the like, for taking up and paying out the slings so as to accommodate different sizes of loads of lumber.

When the lumber collected in the bin is released onto the usual underlying conveyor chains, the slings are relaxed to lower the lumber onto the chains, and an operator then approaches each end of the lumber collection and manually pulls the slings outwardly away from the lumber.

There are several serious problems with such a system. For one thing, manual clearing of the slings is dangerous and quite time-consuming. For another, obviously only two slings can be used to form each bin, since endo sling clearance of an intermediate sling would be impossible. In other words, such an intermediate sling would not be able to clear the chains supporting the lumber on either side of the sling. Hence, the minimum board length which can be held in a bin has been defined in the past by the distance between the two slings.

A general object of the present invention is to provide a unique sling construction, in the setting of a sorter of the type generally outlined, which takes these concerns and considerations into account in a very practical and satisfactory manner.

More particularly, an object of the invention is to provide a sling-type lumber sorter which completely obviates the dangers encountered heretofore with prior types of sling sorters, and which further enables an extremely speedy unloading operation for collected lumber.

Another object of the invention is to provide such a sorter wherein the bins are capable of receiving and supporting boards of different lengths, including boards having lengths which are less than the distance between the two outer or end slings that define the end limits of a bin.

According to a preferred embodiment of the invention, what is contemplated is a sorter in which flexible slings are used to define the lumber-receiving bins, each of these slings having a releasable end which is released at the time that it is desired to deposit or dump a load of boards. Means is provided for recapturing such freed ends of the slings so as to reform a bin for the later receipt of lumber.

From these general considerations concerning the proposed construction, it will be obvious that the danger existing in the past, with respect to an operator manually having to remove slings, is completely avoided. All that need be done to release a load of lumber is to relax the slings (through the usual reels which are provided for supporting one set of ends of the slings), so as to deposit the lumber onto underlying conveyor chains, with the releasable ends of the slings then released, whereafter the reels may be operated to take up the slings. In other words, with the invention it is not necessary for an operator to approach a stack of lumber during a releasing operation.

Further, with end-releasable slings contemplated, more than two slings may be used to define a bin, including intermediate slings. With the useability of such multiple slings, the distance between the two outer or end slings does not define the minimum board length which can be received and held by a bin. Thus, boards shorter than this distance may be held.

Another feature of the invention is that it can easily be incorporated in existing sling-type sorters without requiring significant modifications of the latter.

Still another feature of the invention is that the proposed apparatus is simple in construction, and presents few maintenance problems.

These and other objects and advantages attained by the invention will become more fully apparent as the description which now follows is read in conjunction with the accompanying drawings.

DESCRIPTION OF THE DRAWINGS

FIG. 1 is a fragmentary top plan view of a lumber sorter including apparatus constructed in accordance with the present invention.

FIG. 2 is a fragmentary side elevation of the sorter of FIG. 1 taken from the bottom side of FIG. 1.

FIG. 3 is an enlarged fragmentary side elevation, with portions broken away, illustrating details of construction of the apparatus of the invention.

FIG. 4 is a fragmentary view, on the same scale as FIG. 3, further illustrating the invention, with this view being taken generally along the line 4—4 in FIG. 3.

FIGS. 5–10, inclusive, are simplified schematic views, on a somewhat smaller scale than FIGS. 3 and 4, showing different stages in the use and operation of the apparatus of the invention.

DETAILED DESCRIPTION OF THE DRAWINGS

Figures 3, 4, 5, 6:
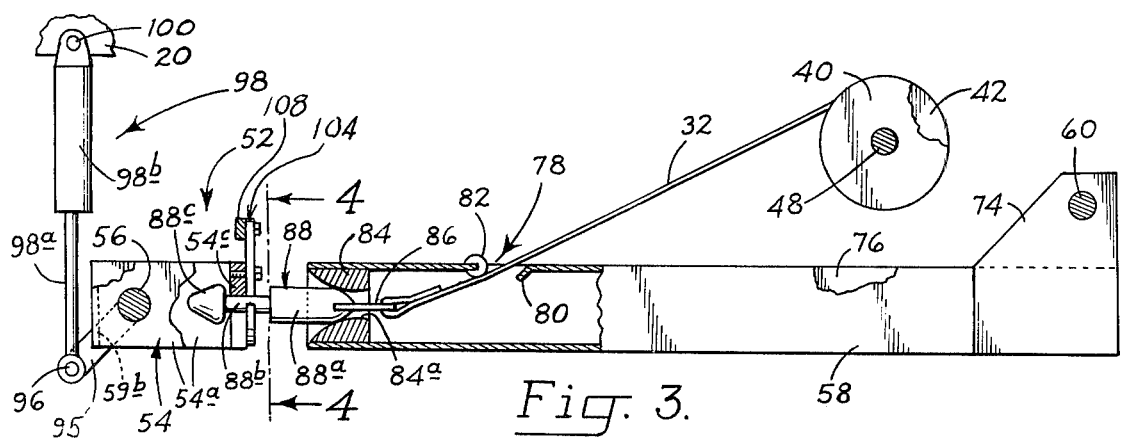

Turning now to the drawings, and referring first to FIGS. 1 and 2, indicated generally at 10 is the receiving end of a lumber sorter, including apparatus constructed in accordance with the present invention, which sorter utilizes flexible slings to define bins for receiving sorted lumber. Lumber is fed into the sorter by means of conventional conveyor chain apparatus, such as that shown generally at 12 in FIGS. 1 and 2. Such lumber is fed in the direction of arrow 14, and is normally oriented to travel at an angle normal to its longitudinal axis. Two collections of lumber which are about to be presented to the sorter are shown at 16, 18 in FIG. 1.

Sorter 10 includes the usual frame shown very simply and fragmentarily at 20 in FIG. 2, on the upper part of which are suitably mounted a plurality of side-by-side disposed, endless traveling chains, such as chain 22, that carry a plurality of generally L-shaped dogs, such as dogs 24. Chains 22 are placed so as to permit feeding of successive boards from apparatus 12 into the pockets provided by the dogs, with chains 22 turning in such a direction that their lower races in FIG. 2 travel to the right, and their upper races travel to the left.

Conventional sorting means is provided at the top of the sorter, and along its length, which means, working in conjunction with the dogs, serves to sort lumber in accordance with length, and to eject a board from its holding dogs when the board is disposed over the appropriate bin chosen for its length.

Distributed along the length of the sorter are plural bins for receiving sorted lumber — four of these bins being indicated generally at 26, 27, 28, 30 in FIGS. 1 and 2. According to the present invention, and as will shortly be described in more detail, each of the bins is defined by a plurality of elongated flexible slings, such as slings 32, 34, 36, 38, which make up bin 26. As can be seen in FIG. 1, these four slings are distributed generally across the width of the sorter. Slings 32, 38 are referred to as end slings, and slings 34, 36 as intermediate slings. While, as will become apparent, different specific spacings may be provided for the slings, in sorter 10, sling 38 is spaced about 122-centimeters from sling 36, sling 36 about the same distance from sling 34, and sling 34 about 152-centimeters from sling 32.

Considering in very general terms the mountings provided for the slings, an end of each sling is trained over a reel, such as reels 40, 42, 44, 46 which are provided for the right ends of slings 32, 34, 36, 38, respectively, in FIGS. 1 and 2. These four reels are suitably joined to a common drive shaft (shown at 48 in FIG. 2) which is drivingly connected to a suitable motor (concealed), such as an hydraulic motor. In order to simplify FIG. 1, shaft 48 has been omitted therein. With operation of the motor just mentioned, reels 40, 42, 44, 46 turn in a common direction and at a common speed to take up or pay out the respective associated slings, depending, of course, on the direction of motor rotation. The reels just discussed are also referred to herein as sling-adjustment means, and further, as first mounting means. Shaft 48 is suitably journaled on support structure including end plates, like plate 50 (see FIG. 2), which are suitably secured to frame 20.

As is further contemplated by the present invention, the other end of each sling in bin 26 is releasably mounted on frame 20 through mechanism, still to be more fully described, referred to both as capture-release means, and as second mounting means. Indicated generally at 52 in FIG. 2 is a latch/catch mechanism usable in conjunction with sling 32, and shown attaching the associated end of the sling on a rocker member 54. Member 54 is anchored to a shaft 56 that extends across the sorter and is suitably journaled on the frame 20. Means which will be described shortly is provided for rotating bar 56 for a purpose which will soon be fully explained. A latch/catch mechanism, like mechanism 52, and a rocker member, like member 54, are provided for the corresponding ends of each of the other three slings making up bin 26. All of the rocker members, when viewed from a side of the sorter as in FIG. 2, have a common angular orientation with respect to the axis of shaft 56, and are also joined to the shaft for rotation as a unit therewith. When the shaft is turned, therefore, the rocker members move in unison.

Also included in the capture-release means provided for sling 32 is an elongated swing arm 58, through the lower end of which in FIG. 2 is threaded the sling. The upper end of arm 58 is pivoted on a bar 60 carried by plate 50. The pivot axis provided by bar 60 is substantially parallel to the rotational axis of shaft 48. Also, it will be noticed that these two axes are laterally offset from one another. The significance of this construction will be discussed later.

All of the other slings forming the other bins in sorter 10 are provided with sling-adjustment means and capture-release means like those which have just generally been described for the slings making up bin 26. For simplicity in manufacture, successive, adjacent pairs of bins in sorter 10 have been constructed in what might be thought of as a back-to-back arrangement. Thus, elements associated with the slings making up bin 27 share the mounting structure, including plate 50, in common with like components associated with the slings in bin 26. For example, it will be seen how a reel and a swing arm associated with the nearest sling shown for bin 27 in FIG. 2 are mounted and positioned with respect to the structure including plate 50.

It will be noted in FIG. 2 that several of the bins shown therein are illustrated in different conditions. For example, bin 26 is shaped with a significant length of the slings paid out so as to accommodate a rather large supply of lumber, shown at 62. Bin 27 is shaped with its sling substantially fully taken up. Bins 28, 30 are configured in about the same way as each other, with their respective sets of slings slightly paid out.

Further considering the basic construction of sorter 10, provided adjacent the base of frame 20, and extending longitudinally throughout the length of the sorter, are plural laterally spaced power-driven conveyor chains 64, 66, 68, 70 which are distributed generally across the width of the sorter, and which form what is referred to herein as a conveyor means in the sorter. The tops of these chains define what is referred to as a conveyor expanse beneath the bins for receiving sorted lumber from the bins, and for then transporting the piles of sorted lumber through and out of the conveyor in a direction to the right in FIGS. 1 and 2. A pile of such lumber which has been deposited onto these chains is shown generally at 72 in FIG. 2.

FIGS. 3 and 4 show details of construction of the apparatus which has been incorporated in conveyor 10 in accordance with the invention. In particular, details are shown therein of the sling-adjustment means and of the capture-release means which are used in conjunction with slings 32, 34 in bin 26. Previously mentioned swing arm 58 comprises an elongated hollow, rectangular tube, the right end of which is mounted for free rotation on bar 60 through a bracket structure 74. The swing arm, shown partially at 76, provided for sling 34 is similarly constructed and mounted on bar 60. Formed in the top face of arm 58 is a generally rectangular opening 78 through which sling 32 freely extends as shown. A downturned lip 80 and a generally cylindrical bumper 82 provided on opposite sides of this opening protect the sling against wear. A plug 84, including a central opening 84a, is secured in the left end of arm 58. Opening 84a is large enough to provide free clearance for sling 32.

Attached to the left end of sling 32 in FIG. 3, as shown, through a lug 86, is generally cylindrical catch 88, having the configuration illustrated. Catch 88 includes an inner large-diameter portion 88a which is joined to lug 86, a central reduced-diameter portion 88b, and an outer somewhat conical portion 88c. Catch 88 is sized so as to be too large to pass through opening 84a. In FIG. 3, sling 32 is shown substantially fully taken up, with the inner portion 88a of catch 88 drawn against plug 84.

Also forming part of previously mentioned latch/catch mechanism 52 is previously mentioned rocker member 54, referred to herein as a latch. Member 54 includes side plates 54a joined to opposite end plates 54b, 54c. The top and bottom sides of member 54 in FIGS. 3 and 4 are open. End plate 54c is provided with a downwardly facing notch 90 (shown in FIG. 2). Side plates 54a are joined as by welding to previously mentioned shaft 56, this shaft being journaled in bearings such as those shown at 94 in FIG. 4.

Referring especially to FIG. 3, joined as by welding to shaft 56 is a radially extending crank 95 which is pivoted at 96 to the outer end of rod 98a in an hydraulic motor 98 which also includes a cylinder 98b. The upper end of cylinder 98b in FIG. 3 is pivoted at 100 on sorter frame 20. It will be obvious that with extension and contraction of motor 98, shaft 56, and hence the rocker members (like rocker member 54) rotate about the axis of shaft 56.

In FIG. 3, motor 98 is extended to rotate the rocker members substantially into horizontal positions. Further, arm 58 occupies a position whereby catch 88, and particularly the central portion of the catch, is received within notch 90.

Completing a description of what is shown in FIGS. 3 and 4, and referring particularly to rocker member 54, pivoted to the outside face of end plate 54c at 102, is a hook 104. Hook 104 includes a lower curved portion 10a which is shown in a position locking the catch within notch 90 in the latch. The hook also includes an upper arm portion 104b which is pivoted at 106 to an elongated actuator bar 108. The left end of bar 108 is connected to the outer end of the rod in an hydraulic motor 110 which is pivoted at 112 to structure 113 that is joined to and rotates with shaft 56. Hooks, such as hook 104, are provided on each of the other rocker members, or latches, associated with the slings in bin 26, each of these other hooks being similarly connected to actuator bar 108 for simultaneous actuation of the hooks. With motor 110 extended to the position in which it is shown, it will be seen that the hooks positively prevent disengagement of the catches and latches. On contraction of motor 110, the hooks swing (counterclockwise in FIG. 4) to positions permitting gravity-release of the catches from the latches.

Explaining now how the apparatus of the invention operates, reference will be made to FIGS. 5–10, inclusive. Further, a description will take place with respect to the elements associated with bin 26 in the sorter. Initially, the bin as it awaits receipt of lumber is configured as shown in FIG. 5. Motor 98 has been contracted to shift the latches, such as latch 54, into downwardly extending positions, and the catches, such as catch 88, are secured to the latches by the hooks previously mentioned, such as hook 104. A certain amount of the slings in the bin have been paid out from the associated reels through slight counterclockwise rotation (in FIG. 5) of shaft 48. The swing arms associated with the slings are thus somewhat downwardly inclined, as is indicated for arm 58 in FIG. 5.

As lumber is dropped into bin 26, and when the need arises for making more room in the bin for additional lumber, shaft 48 is rotated progressively further counterclockwise so as to pay out more and more of the slings from the reels. FIG. 6 illustrates a condition where a substantial amount of sling length has been paid out to enlarge the bin so as to accommodate a fairly sizable pile of lumber, such as that shown at 114. Such paying out of the slings results in even greater downward inclining of the swing arms associated with the slings.

When it is decided that enough lumber has been collected in bin 26, and referring now to FIG. 7, shaft 48 is rotated still further counterclockwise to pay out even more of the slings so as to lower pile 114 onto the underlying conveyor chains, as well as subsequently to slack the slings. In FIG. 7, pile 114 has been placed on the underlying chains, and slack has been developed in the slings.

Referring to FIG. 8, what next occurs is that motor 98 is extended to rotate the latches into horizontal positions such as that shown for latch 54 in the figure. Next, motor 110 (see FIG. 4) is contracted to pull on actuator bar 108, thus to swing the hooks locking the catches in place to a position allowing escape of the catches.

Considering FIG. 9, what occurs with such contraction of motor 110, is that the catches drop away from the latches onto the floor underlying the sorter. Shaft 48 is then rotated in a clockwise direction in FIG. 9 to begin pulling the slings and attached catches underneath the deposited lumber pile, and to take up the slings on the reels.

Referring to FIG. 10 with sufficient taking up of the slings, the catches thereon seat against the plugs at the outer ends of the swing arms, and because of the spacing previously mentioned between the axes of shafts 48, 60, continued taking up of the sling causes upward swinging of the swing arms as indicated by the curved arrows in FIG. 10. Such swinging results in placement of the catches again in proper position with respect to the latches whereby extension of motor 110 will cause the hooks again to lock the latches and catches.

To prepare bin 26 for another load of lumber, motor 98 is contracted, and shaft 48 rotated to pay out a slight amount of the slings, so as to reconfigure the bin as shown in FIG. 5. The cycle may then be repeated.

It will thus be apparent that the apparatus proposed by the invention meets all of the objectives ascribed to it earlier. It can clearly be seen that it is not necessary for an operator to approach a lumber pile in order to remove the slings from it. Further, it will be apparent that intermediate slings can be used between end slings, thus to allow a bin to accommodate a relatively wide range of board lengths. FIG. 1 in the drawing amply illustrates this situation. For example, it will be noted that in lumber pile 62 there are many boards having lengths which could not have been held had bin 26 simply been defined by end slings 32, 38. Accordingly, the apparatus of the invention affords a great deal of versatility with respect to the lateral location of slings.

Still another feature of the invention, inasmuch as a person need not approach a deposited lumber pile to remove slings, is that the underlying conveyor chains need not be stopped during the operation of clearing a pile from the slings.

Further, it will be noted that the proposed apparatus is relatively simple in construction, and can be operated easily with very little skill required of an operator.

While a preferred embodiment of the invention has been described, it is appreciated that variations and modifications may be made without departing from the spirit of the invention.

What is claimed is:

1. In a lumber sorter including a frame,
an elongated flexible sling for forming at least a portion of an open-topped bin for the receipt of sorted lumber,
first mounting means nonreleasably mounting one end of said sling at one fixed position on said frame, and
second mounting means releasably mounting the other end of said sling at another fixed position on said frame for selective release and recapture of said other end.

2. In a lumber sorter including a frame,
at least a pair of elongated, flexible, laterally spaced slings defining a bin for the receipt of sorted lumber,
sling-adjustment means mounting one set of ends of said slings on said frame for taking up and paying out of the slings, and
capture-release means releasably mounting the other set of ends of said slings on said frame for selective release and recapture of said other set of ends.

3. The sorter of claim 2, wherein said sling adjustment means comprises, for each sling, a rotatable reel which receives said one end of said sling, and said capture-release means for said sling comprises an elongated swing arm pivoted on said frame and including means defining an opening through which said sling is threaded for free longitudinal movement of the sling in the opening with rotation of said reel.

4. The sorter of claim 3, wherein, with respect to each sling, the pivot axis of the associated swing arm is offset from and substantially parallel to the rotational axis of the associated reel.

5. The sorter of claim 4, wherein said capture-release means, for each sling, further comprises a latch mounted on said frame, and a catch releasably engageable with said latch attached to said other end of said sling, said catch being configured to prevent its movement through the opening in the swing arm associated with said sling, thus to prevent retraction of said sling from said opening.

6. The sorter of claim 5, wherein, with respect to each sling, with the associated latch and catch disengaged, and with said catch engaging the associated swing arm, said associated reel, pivot axis and latch are disposed on said frame whereby, taking up of said sling by said reel causes upward swinging of said swing arm to move said catch toward a position of captured engagement with said latch.

7. In a lumber sorter including a frame, and a plurality of laterally spaced, substantially parallel, power-operated conveyor means mounted adjacent the base of said frame and defining a conveyor expanse extending through the sorter for carrying sorted lumber through and away from the same,
a plurality of elongated, flexible, laterally spaced slings distributed across said conveyor expanse and defining a bin above said conveyor means for receiving sorted lumber, at least one of said slings being positioned laterally intermediate an adjacent pair of said conveyor means,
sling-adjustment means mounting one set of ends of said slings on said frame for taking up and paying out of the slings, and
capture-release means releasably mounting the other set of ends of said slings on said frame for selective release and recapture of said other set of ends, releasing of said other set of ends opening said bin and effecting deposit on the said conveyor means of any lumber held by said slings, and recapture of said other set of ends effecting reforming of said bin.

8. The sorter of claim 7, wherein said sling adjustment means comprises, for each sling, a rotatable reel which receives said one end of said sling, and said capture-release means for said sling comprises an elongated swing arm pivoted on said frame and including means defining an opening through which said sling is threaded for free longitudinal movement of the sling in the opening with rotation of said reel.

9. The sorter of claim 8, wherein, with respect to each sling, the pivot axis of the associated swing arm is offset from and substantially parallel to the rotational axis of the associated reel.

10. The sorter of claim 9, wherein said capture-release means, for each sling, further comprises a latch mounted on said frame, and a catch releasably engageable with said latch attached to said other end of said sling, said catch being configured to prevent its movement through the opening in the swing arm associated with said sling, thus to prevent retraction of said sling from said opening.

11. The sorter of claim 10, wherein, with respect to each sling, with the associated latch and catch disengaged, and with said catch engaging the associated swing arm, said associated reel, pivot axis and latch are disposed on said frame whereby, taking up of said sling by said reel causes upward swinging of said swing arm to move said catch toward a position of captured engagement with said latch.

12. In a lumber sorter including a frame, and a plurality of laterally spaced substantially parallel power-operated conveyor means mounted adjacent the base of said frame and defining a conveyor expanse of predetermined length and width extending through the sorter for carrying sorted lumber through the sorter along the length of said expanse,
a plurality of elongated, flexible laterally spaced slings distributed across the width of said expanse and defining a bin above said conveyor means for receiving sorted lumber, said plurality of slings including a pair of end slings adjacent the opposite sides of said expanse, and at least one intermediate sling positioned between said end slings,
sling-adjustment means mounting one set of ends of said slings on said frame for taking up and paying out of the slings, and
capture-release means releasably mounting the other set of ends of said slings on said frame for selective release and recapture of said other set of ends, releasing of said other set of ends opening said bin and effecting deposit onto said conveyor means of any lumber held by said slings, and recapture of said other set of ends effecting reforming of said bin.

13. In a lumber sorter including a frame,
an elongated flexible sling for forming at least a portion of a bin for the receipt of sorted lumber,
first mounting means nonreleasably mounting one end of said sling on said frame and including means for selectively taking up and paying out the sling, and
second mounting means releasably mounting the other end of said sling on said frame for selective release and recapture of said other end.

* * * * *

REEXAMINATION CERTIFICATE (1208th)
United States Patent
Moore

[11] B1 4,098,407
[45] Certificate Issued  Feb. 27, 1990

[54] LUMBER SORTING SYSTEM

[75] Inventor: Jack Moore, Portland, Oreg.

[73] Assignee: Oregon Bank, The Oregon Banking Corporation

Reexamination Request:
No. 90/001,596, Aug. 31, 1988

Reexamination Certificate for:
Patent No.: 4,098,407
Issued: Jul. 4, 1978
Appl. No.: 722,638
Filed: Sep. 13, 1976

[51] Int. Cl.⁴ ............................................. B65G 47/34
[52] U.S. Cl. ...................... 209/517; 209/521; 209/933; 414/268
[58] Field of Search ............... 209/517, 518, 521, 933; 414/48, 49, 97, 98, 267, 268, 745

[56] References Cited
U.S. PATENT DOCUMENTS

| | | | |
|---|---|---|---|
| 585,415 | 6/1897 | Waterhouse | 54/84 |
| 643,558 | 2/1900 | Tallet | 294/75 |
| 798,560 | 8/1905 | Von Bechtolsheim | 212/77 |
| 964,250 | 7/1910 | Hanson | 294/75 |
| 1,181,000 | 4/1916 | Gregg | 294/75 |
| 1,221,693 | 4/1917 | Crosby | 294/75 |
| 1,505,663 | 8/1924 | Oliver et al. | 294/74 |
| 1,862,312 | 6/1932 | Kositzky | 294/75 |
| 3,101,754 | 8/1963 | Stupfel | 83/106 |
| 3,631,976 | 1/1972 | Coffelt et al. | 209/933 X |
| 3,647,063 | 3/1972 | Rowley | 209/518 |
| 3,776,379 | 12/1973 | Harvey | 209/518 |

FOREIGN PATENT DOCUMENTS 347729  11/1972  Sweden .

Primary Examiner—Margaret A. Focarino

[57] ABSTRACT

A lumber sorter in which flexible slings define the bins for receiving sorted lumber. One end of each sling is selectively releasable from attachment to the sorter frame so as to effect release of lumber onto underlying conveyor chains. Mechanism is included for taking up a released sling, and in the process, for causing recapture of the free end of the sling so as to reform a bin for the later receipt of lumber.

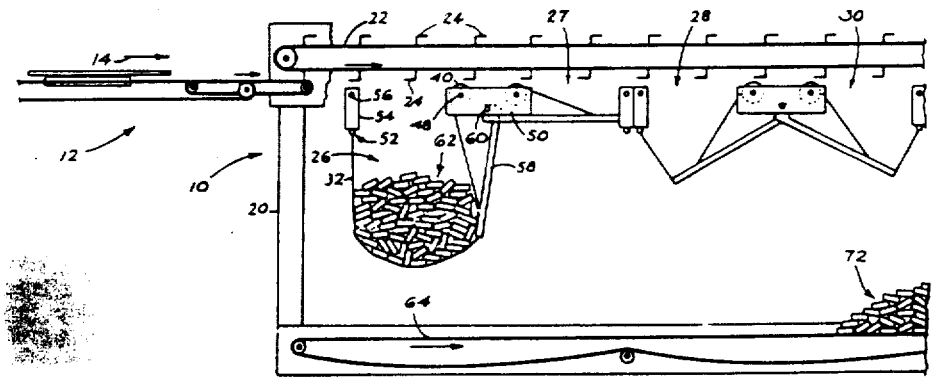

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 3, 5, 7, 12 and 13 are determined to be patentable as amended.

Claims 4, 6 and 8–11, dependent on an amended claim, are determined to be patentable.

New claims 14–19 are added and determined to be patentable.

1. In a lumber sorter including a frame,
an elongated flexible sling for forming at least a portion of an open-topped bin for the receipt of sorted lumber,
first mounting means nonreleasably mounting one end of said sling at one fixed position on said frame, [and]
*a swing arm pivotally mounted to the frame and movably supporting the sling,*
second mounting means releasably mounting the other end of said sling at another fixed position on said frame [for selective release and recapture of said other end], *and including second locking means on said frame,*
*first locking means on said other end of said sling swingable by said swing arm into a position adjacent said second locking means, and*
means selectively operable for actuating said second locking means to positively interlock said first and second locking means to capture said first locking means, and further selectively operable for actuating said second locking means to disengage said first and second locking means and release said first locking means.

2. In a lumber sorter including a frame, at least a pair of elongated, flexible, laterally spaced slings defining a bin for the receipt of sorted lumber,
sling-adjustment means mounting one set of ends of said slings on said frame for taking up and paying out of the slings, [and]
capture-release means releasably mounting the other set of ends of said slings on said frame [for selective release and recapture of said other set of ends], *and including second locking means on said frame,*
*first locking means on said other set of ends movable into a position adjacent said second locking means, and*
*means selectively operable for actuating said second locking means to positively interlock said first and second locking means and capture said first locking means, and further selectively operable for actuating said second locking means to disengage said first and second locking means and release said first locking means.*

3. The sorter of claim 2, wherein said sling adjustment means comprises, for each sling, a rotatable reel which receives said one end of said sling, and said capture-release means for [said] *each* sling comprises an elongated swing arm pivoted on said frame and including means defining an opening through which said sling is threaded for free longitudinal movement of the sling in the opening with rotation of said reel.

5. The sorter of claim 4, wherein [said capture-release means, for each sling, further] *for each sling, said second locking means and said first locking means, respectively,* comprises a latch mounted on said frame, and a catch releasably enageagable with said latch attached to said other end of said sling, said catch being configured to prevent its movement through the opening in the swing arm associated with said sling, thus to prevent retraction of said sling from said opening.

7. In a lumber sorter including a frame, and a plurality of laterally spaced, substantially parallel, power-operated *continuously moving* conveyor means mounted adjacent the base of said frame and defining a conveyor expanse extending through the sorter for carrying sorted lumber through and away from the same,
a plurality of elongated, flexible, laterally spaced slings distributed across said conveyor expanse and defining a bin above said conveyor means for receiving sorted lumber, at least one of said slings being positioned laterally intermediate an adjacent pair of said conveyor means,
sling-adjustment means mounting one set of ends of said slings on said frame for taking up and paying out of the slings, and
capture-release means releasably mounting the other set of ends of said slings on said frame for selective release and recapture of said other set of ends, releasing of said other set of ends opening said bin and effecting deposit on the said conveyor means of any lumber held by said slings, and recapture of said other set of ends effecting reforming of said bin *independent of a position of said sorted lumber on said conveyor means while maintaining continuous movement of said conveyor means.*

12. In a lumber sorter including a frame, and a plurality of laterally spaced substantially parallel power-operated *continuously moving* conveyor means mounted adjacent the base of said frame and defining a conveyor expanse of predetermined length and width extending through the sorter for carrying sorted lumber through the sorter along the length of said expanse,
a plurality of elongated, flexible laterally spaced slings distributed across the width of said expanse and defining a bin above said conveyor means for receiving sorted lumber, said plurality of slings including a pair of end slings adjacent the opposite sides of said expanse, and at least one intermediate sling positioned between said end slings,
sling-adjustment means mounting one set of ends of said slings on said frame for taking up and paying out of the slings, and
capture-release means releasably mounting the other set of ends of said slings on said frame for selective release and recapture of said other set of ends, releasing of said other set of ends opening said bin and effecting deposit onto said conveyor means of any lumber held by said slings, and recapture of said other set of ends effecting reforming of said bin

*independent of a position of said sorted lumber on said conveyor means while maintaining continuous movement of said conveyor means.*

13. In a lumber sorter including a frame,
an elongated flexible sling for forming at least a portion of the bin for the receipt of sorted lumber,
first mounting means nonreleasably mounting one end of said sling on said frame and including means for selectively taking up and paying out the sling, [and]
second mounting means releasably mounting the other end of said sling on said frame [for selective release and recapture of said other end], *and including second locking means on said frame,*
*first locking means on said other end of said sling movable into a position adjacent said second locking means, and*
*means selectively operable for actuating said second locking means to positively interlock said first and second locking means and capture said first locking means, and further selectively operable for actuating said second locking means to disengage said first and second locking means and release said first locking means.*

14. *In a lumber sorter including a frame, and a plurality of laterally spaced, substantially parallel power-operated conveyor means mounted adjacent the base of said frame and defining a conveyor expanse extending through the sorter for carrying sorted lumber through and away from the same, a plurality of elongated, flexible, laterally spaced slings distributed across said conveyor expanse and defining a bin above said conveyor means for receiving sorted lumber, at least one of said slings being positioned laterally intermediate an adjacent pair of said conveyor means,*
  *sling-adjustment means mounting one set of ends of said slings on said frame for taking up and paying out the slings,*
  *capture-release means releasably mounting the other set of ends of said slings on said frame, and including second locking means on said frame,*
  *first locking means on said other set of ends movable into a position adjacent said second locking means, and*
  *means selectively operable for actuating said second locking means to capture said first locking means and form said bin, and further selectively operable for actuating said second locking means to disengage said first and second locking means and release said first locking means, open said bin and effect deposit on the conveyor means of any lumber held by said slings.*

15. *The sorter of claim 14, wherein said sling adjustment means comprises, for each sling, a rotatable reel which receives said one end of said sling, and said capture-release means for each sling comprises an elongated swing arm pivoted on said frame and including means defining an opening through which said sling is threaded for free longitudinal movement of the sling in the opening with rotation of said reel.*

16. *The sorter of claim 15, wherein, with respect to each sling, the pivot axis of the associated swing arm is offset from and substantially parallel to the rotational axis of the associated reel.*

17. *The sorter of claim 16, wherein for each sling, said second locking means and said first locking means, respectively, comprises a latch mounted on said frame, and a catch releasably engageable with said latch attached to said other end of said sling, said catch being configured to prevent its movement through the opening in the swing arm associated with said sling, thus to prevent retraction of said sling from said opening.*

18. *The sorter of claim 17, wherein, with respect to each sling, with the associated latch and catch disengaged, and with said catch engaging the associated swing arm, said associated reel, pivot axis and latch are disposed on said frame whereby, taking up of said sling by said reel causes upward swinging of said swing arm to move said catch toward a position of captured engagement with said latch.*

19. *In a lumber sorter including a frame, and a plurality of laterally spaced, substantially parallel power-operated conveyor means mounted adjacent the base of said frame and defining a conveyor expanse of predetermined length and width extending through the sorter for carrying sorted lumber through the sorter along the length of said expanse,*
  *a plurality of elongated, flexible laterally spaced slings distributed across the width of said expanse and defining a bin above said conveyor means for receiving sorted lumber, said plurality of slings including a pair of end slings adjacent the opposite sides of said expanse, and at least one intermediate sling positioned between said end slings,*
  *sling-adjustment means mounting one set of ends of said slings on said frame for taking up and paying out of the slings,*
  *capture-release means releasably mounting the other set of ends of said slings on said frame, and including second locking means on said frame,*
  *first locking means on said other set of ends movable into a position adjacent said second locking means, and*
  *means selectively actuable for moving said second locking means relative to said first locking means for capturing said first locking means and forming said bin, and further selectively actuable for moving said second locking means oppositely relative to said first locking means for disengaging said first and second locking means and releasing said first locking means, opening said bin and effecting deposit onto said conveyor means of any lumber held by said slings.*

* * * * *